US009612745B2

(12) United States Patent
Fenske (10) Patent No.: US 9,612,745 B2
(45) Date of Patent: Apr. 4, 2017

(54) RAID SET INITIALIZATION

(71) Applicant: Silicon Graphics International Corporation, Milpitas, CA (US)

(72) Inventor: Larry Fenske, Loveland, CO (US)

(73) Assignee: Silicon Graphics International Corp., Milpitas, CA (US)

( * ) Notice: Subject to any disclaimer, the term of this patent is extended or adjusted under 35 U.S.C. 154(b) by 464 days.

(21) Appl. No.: 14/164,045

(22) Filed: Jan. 24, 2014

(65) Prior Publication Data

US 2015/0212736 A1    Jul. 30, 2015

(51) Int. Cl.
*G06F 12/00*    (2006.01)
*G06F 3/06*    (2006.01)

(52) U.S. Cl.
CPC .......... *G06F 3/0604* (2013.01); *G06F 3/0632* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 5,502,836 A * | 3/1996 | Hale | ................... | G06F 11/1096 711/112 |
| 6,546,457 B1 * | 4/2003 | Don | ...................... | G06F 3/0605 711/114 |
| 6,976,124 B2 * | 12/2005 | Morita | ................... | G06F 3/0611 711/114 |
| 7,711,897 B1 * | 5/2010 | Chatterjee | ............ | G06F 3/0605 711/112 |
| 2003/0233596 A1 * | 12/2003 | Corbin | ................ | G06F 11/1092 714/5.11 |
| 2008/0229012 A1 * | 9/2008 | Therene | ............. | G06F 11/1076 711/114 |
| 2009/0006746 A1 * | 1/2009 | Sharma | ................. | G06F 3/0617 711/114 |
| 2009/0307423 A1 * | 12/2009 | Galloway | ........... | G06F 11/1076 711/114 |
| 2011/0029728 A1 * | 2/2011 | Popovski | .............. | G06F 3/0611 711/114 |
| 2015/0006818 A1 * | 1/2015 | Kobashi | ................ | G06F 3/0604 711/114 |

* cited by examiner

*Primary Examiner* — Ryan Bertram
*Assistant Examiner* — Jason Blust
(74) *Attorney, Agent, or Firm* — Polsinelli LLP (57) ABSTRACT

Embodiments of the presently claimed invention enable a RAID set to appear as if it were initialized immediately after a command to initialize a RAID set is initiated. Typically, a driver or other software in the software stack intercepts the command to initialize the RAID set. The driver then responds to user application programs as if the RAID set initialization is complete, even when it is not. After intercepting the RAID set initialization command, the driver will intercept and respond to data read or write commands as if the RAID set were initialized. The driver or other software will then, typically initialize the RAID set using background tasks. In certain instances, data stored in a non-RAID configuration may be migrated to a RAID configuration during the initialization process.

18 Claims, 5 Drawing Sheets

LBAS Not Identical: 0-9

| VUD | LBA 0 | ND |
|---|---|---|
| VUD | LBA 1 | ND |
| VUD | LBA 2 | ND |
| VUD | LBA 3 | ND |
| VUD | LBA 4 | ND |
| VUD | LBA 5 | ND |
| VUD | LBA 6 | ND |
| VUD | LBA 7 | ND |
| VUD | LBA 8 | ND |
| VUD | LBA 9 | ND |

LBAS Not Identical: 2-9
After Copying LBAS 0-1

| InD | LBA 0 | InD |
|---|---|---|
| InD | LBA 1 | InD |
| VUD | LBA 2 | ND |
| VUD | LBA 3 | ND |
| VUD | LBA 4 | ND |
| VUD | LBA 5 | ND |
| VUD | LBA 6 | ND |
| VUD | LBA 7 | ND |
| VUD | LBA 8 | ND |
| VUD | LBA 9 | ND |

LBAS Not Identical: 2-5, & 7-9
After a Write to LBA 6

| InD | LBA 0 | InD |
|---|---|---|
| InD | LBA 1 | InD |
| VUD | LBA 2 | ND |
| VUD | LBA 3 | ND |
| VUD | LBA 4 | ND |
| VUD | LBA 5 | ND |
| InD | LBA 6 | InD |
| VUD | LBA 7 | ND |
| VUD | LBA 8 | ND |
| VUD | LBA 9 | ND |

Stripes Uninitialized: 0-8

| LBA 0 | VUD | ND | ND |
|---|---|---|---|
| LBA 1 | VUD | ND | ND |
| LBA 2 | VUD | ND | ND |
| LBA 3 | VUD | ND | ND |
| LBA 4 | VUD | ND | ND |
| LBA 5 | VUD | ND | ND |
| LBA 6 | VUD | ND | ND |
| LBA 7 | VUD | ND | ND |
| LBA 8 | VUD | ND | ND |

After Background Init. Of Stripe 0
Stripes Not Uninitialized: 1-8

| LBA 0 | 0A | 0B | 0C |
|---|---|---|---|
| LBA 1 | MD | ND | ND |
| LBA 2 | MD | ND | ND |
| LBA 3 | VUD | ND | ND |
| LBA 4 | VUD | ND | ND |
| LBA 5 | VUD | ND | ND |
| LBA 6 | VUD | ND | ND |
| LBA 7 | VUD | ND | ND |
| LBA 8 | VUD | ND | ND |

Stripes Uninitialized: 1, & 3-8
After Write LBA 6, a Portion of Stripe 2

| LBA 0 | 0A | 0B | 0C |
|---|---|---|---|
| LBA 1 | MD | ND | ND |
| LBA 2 | MD | ND | ND |
| LBA 3 | VUD | ND | ND |
| LBA 4 | VUD | ND | ND |
| LBA 5 | VUD | ND | ND |
| LBA 6 | 2A | 2B | 2C |
| LBA 7 | MD | ND | ND |
| LBA 8 | MD | ND | ND |

RAID SET INITIALIZATION

BACKGROUND OF THE INVENTION

Field of the Invention

The present invention generally relates to initializing a redundant array of independent disks (RAID). In particular, the invention enables a RAID set to service requests immediately after the RAID set is described.

Description of the Related Art

Redundant arrays of independent disks, commonly referred to as RAID, must be initialized prior to use. A RAID set includes two or more data storage devices used to store data redundantly and increase data storage performance.

Conventionally, the initialization of a RAID set requires zeros to be written to each data storage location contained within each of the data storage devices in the RAID set. Today, each individual data storage device in a RAID set commonly contains many Terabytes of data. Since the process of writing zeros to a one Terabyte drive takes days, there is a large overhead associated with initializing a RAID set. Delays associated with waiting for RAID set initialization increases both direct and indirect costs of running a data center. Direct costs include the cost of space and power used during initialization. Indirect costs include not being able to use or lease data storage space on the RAID set when the RAID set is being initialized. Costs associated with initializing a RAID set would be reduced if the RAID set could act as an initialized RAID set immediately after it was described.

Examples of standard RAID levels include RAID 0, RAID 1, RAID 2, RAID 3, RAID 4, RAID 5, RAID 6, and RAID 10.

RAID 0 includes two or more data storage devices where each data storage device is written with the data evenly distributed across the data storage devices in equal sized chunks, without redundancy. These chunks of data are referred to as stripes. Each consecutive stripe is written to a different data storage device until all of the data storage devices contain a first stripe. After each data storage device has been written with a first stripe, a second set of stripes are written to the RAID set. This process is repeated until all data is written to the RAID set. RAID 0 is typically used when one wishes to increase the input/output performance of a data storage system.

RAID 1 is a mirror, wherein two or more data storage devices contain identical data. Essentially a second data storage device is a copy of a first data storage device. RAID 1 provides a simple form of data redundancy. RAID 2, like RAID 0, stripes data across a plurality of data storage devices. RAID 2, however, stripes at the bit level, not in larger chunks. RAID 2 also includes Hamming code error correction. RAID 3 combines data striping with parity, wherein parity data is stored on a dedicated data storage device. Parity allows the data to be reconstructed when a single data storage device fails using a simple XOR function. RAID 3 stripes data across the data storage devices at the byte level (8 bits).

RAID 4 uses data striping, and also uses a data storage device dedicated to storing parity data. RAID 4 stripes data at the block level. In most data storage devices today, data blocks, also known as logical blocks, contain 512 bytes. RAID 5 uses block level data striping combined with parity distributed across all of the data storage devices in the RAID set.

RAID 6 is similar to RAID 5, yet includes a second set of parity information distributed across the data storage devices in the RAID set. RAID 10 combines striping and mirroring, it is a combination of RAID 0 and RAID 1.

SUMMARY OF THE CLAIMED INVENTION

The present system allows system administrators to immediately use a RAID set after describing it. Typically, a software driver is used to intercept commands targeting the RAID set, and to respond to those commands as if the RAID set were initialized, even when it is not. The invention described herein, in certain embodiments, supports any desired RAID level. The method of the invention will frequently begin after an operator describes a RAID configuration and initiates the initialization of the RAID set. Here, a RAID configuration includes a RAID level, and a set of physical or virtual data storage devices. Once the operator has chosen a RAID level, the operator assigns data storage devices to the RAID set. Then the operator will initiate a command to initialize the RAID set. The command to initialize the RAID set will typically be intercepted by a driver (or other software) in the software stack of the computer system. Once the driver has intercepted the RAID initialization command, the driver will assemble and store information that describes the initialization state of the RAID set.

Next the driver will look (snoop) for commands targeting the RAID set. Commands targeting the RAID set will be intercepted when they are identified (snooped). When the command is a read command to an uninitialized portion of the RAID set, i.e. when the read command targets a portion of the RAID set that may not contain valid RAID set data, the data returned will be zeros. In certain instances, the driver (or other software) will respond to the command by sending zeros for all stripes or logical blocks requested by the read command to the initiator of the read command. The driver may also perform background tasks, such as writing zeros to the uninitialized portions of the RAID set. When the command is a write command to an uninitialized portion of the RAID set, the driver will intercept the write command and write that data to the RAID set. When the write command does not span all data areas or logical blocks in a particular RAID stripe, the driver will write zeros to the data areas or logical blocks in the RAID stripe that were not written by the write command. When the command is a read command or a write command to an initialized portion of the RAID set, the command will be passed through to the RAID set. Commands targeting the RAID set will typically be sent to the RAID set by an initiator, frequently the initiator is a computer writing data to or reading data from the RAID set. An initiator consistent with the invention is not limited to a computer, however. In certain instances the initiator can be another data storage device or set of data storage devices. For example, the small computer system interface (SCSI) standard allows a data storage device to act as an initiator of commands to another data storage device. Furthermore, the initiator in the presently claimed invention is not limited to a computer, a host, a data storage device, a set of data storage devices, a personal computer, a server, a mobile device, or a network appliance acting as an initiator.

Thus, the RAID set is incrementally initialized with each write to the RAID set, or by using writes in the background. As the driver performs the incremental initialization of the RAID set, the driver maintains a record of which stripes or logical blocks are not initialized. Typically, this record will be maintained in a data structure stored in a non-volatile memory. This non-volatile memory typically will reside in the uninitialized portions of the RAID set.

In certain instances, a first data storage device in the RAID set may already store data that the operator wishes to save in a RAID configuration. In these instances the data contained in the first data storage device will have to be converted from a non-RAID configuration to a RAID configuration. Data targeted for conversion from a non-RAID configuration to a RAID configuration may be referred to in this disclosure as "valid uninitialized data", or "data to be converted" to a RAID level. The process of initializing such a RAID set varies depending on the selected RAID level, and whether the first data storage device is included in the new RAID set description.

In general, the instant initialization of the RAID set includes: creating information describing an initialization state of a RAID set corresponding to an intercepted RAID set initialization command, intercepting a data transfer command to the RAID set, and transmitting data to the initiator of the data transfer command when the command is a read command. When such a read command is a read to an uninitialized portion of the RAID set, and when the read command targets a portion of the RAID set that does not contain valid RAID set data, the data returned will include zeros.

In certain instances, when the data transfer command is a write command to an uninitialized portion of the RAID set, the driver (or other software) will write that data to two data storage devices. In other instances, data will be written in complete stripes to a plurality of data storage devices. The presently claimed invention is not limited to initializing a single stripe or single set of logical blocks. Thus, the presently claimed invention may initialize any number of stripes or sets of logical blocks and be consistent with the presently claimed invention.

DETAILED DESCRIPTION OF THE INVENTION

The present system allows system administrators to immediately use a RAID set after describing it. Typically, a software driver is used to intercept commands targeting the RAID set, and to respond to those commands as if the RAID set were initialized, even when it is not. Certain implementations are directed to a RAID set, wherein each of the data storage devices are contained within a single enclosure. Other implementations of the invention are directed to a RAID set, wherein each of the data storage devices may be located in a plurality of different physical locations. Software may be used to make a RAID set appear to consist of a set of data storage devices contained in a single enclosure, even when they are not.

The present system may initialize the RAID set using background tasks. Those of average skill in the art would recognize that a background task is an operation or process that occurs without an operator being aware that the operation or process is being performed. In some embodiments of the invention, certain background initialization tasks may be paused when the RAID set is operating above an operational threshold. Such an operational threshold includes yet is not limited to the number of input/output requests per second (IOPS) sent to a RAID set.

In operation, the system may begin after an operator describes a RAID configuration and initiates the initialization of a RAID set. Typically, a RAID configuration includes a RAID level, and a set of physical or virtual data storage devices. Once the operator has chosen a RAID level, the operator assigns data storage devices to the RAID set. Then the operator will initiate the initialization of the RAID set.

The presently claimed invention is not limited to initializing a single stripe or single set of logical blocks. Thus, the presently claimed invention may initialize any number of stripes or sets of logical blocks and be consistent with the presently claimed invention.

Figure 1:
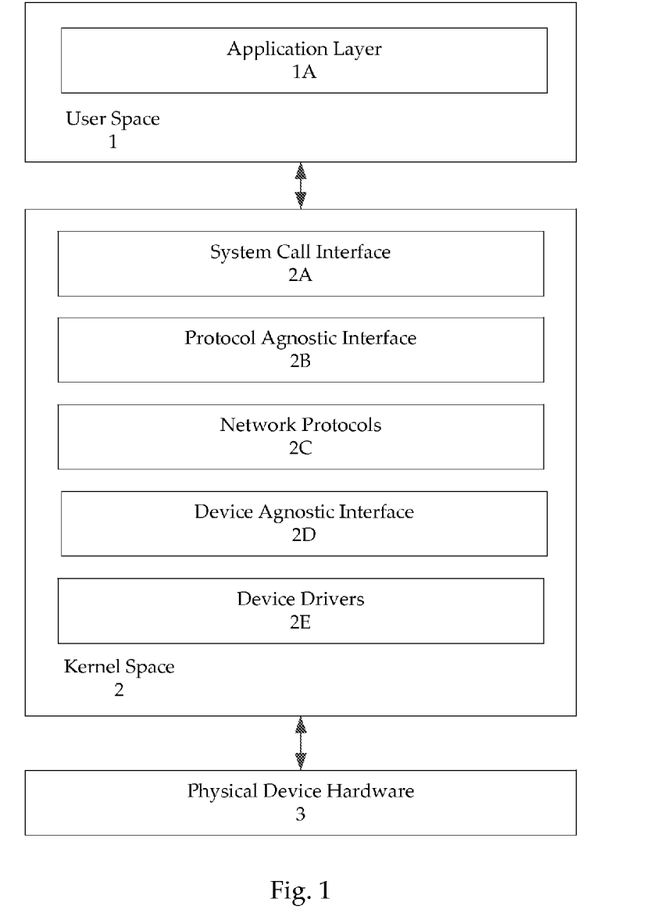
FIG. 1 is a block diagram of a Linux software stack.

FIG. 1 is a block diagram of a Linux software stack. User space 1, including an application layer 1A is depicted in the figure. User space 1 may include a collection of software programs. Typically, these software programs are applications that are not part of the operating system software. Kernel space 2 is located at a lower level of the software stack. Kernel space 2 contains multiple different software programs, when combined; these programs comprise the operating system software of a computer. Kernel space 2, as depicted in FIG. 1, includes a system call interface 2A, a protocol agnostic interface 2B, network protocols 2C, a device agnostic interface 2D, and device drivers 2E. The physical device hardware 3 exists below all of the software levels. Conventionally, an operator manipulates an application program in user space 1, the application program communicates with one or more of the software modules in kernel space 2, and the software modules in kernel space 2 communicate with physical device hardware 3 of the computer system or RAID set.

In certain instances, the initialization command may be intercepted by a driver in the computer system's software stack. While not depicted in FIG. 1, this driver may be located either in a lower level of user space 1 or within kernel space 2. The driver is located at a level below a RAID set configuration application program, and above certain software modules in kernel space 2. Conventionally, software that initializes RAID sets operates in kernel space 2. An example of such a software program in kernel space 2 is the multiple disk administrator utility (MDADM) in the Linux software operating system. By intercepting RAID set initialization commands at a higher level; software programs like MDADM are prevented from receiving the initialization command, and are prevented from performing a conventional initialization of the RAID set.

Figure 2:
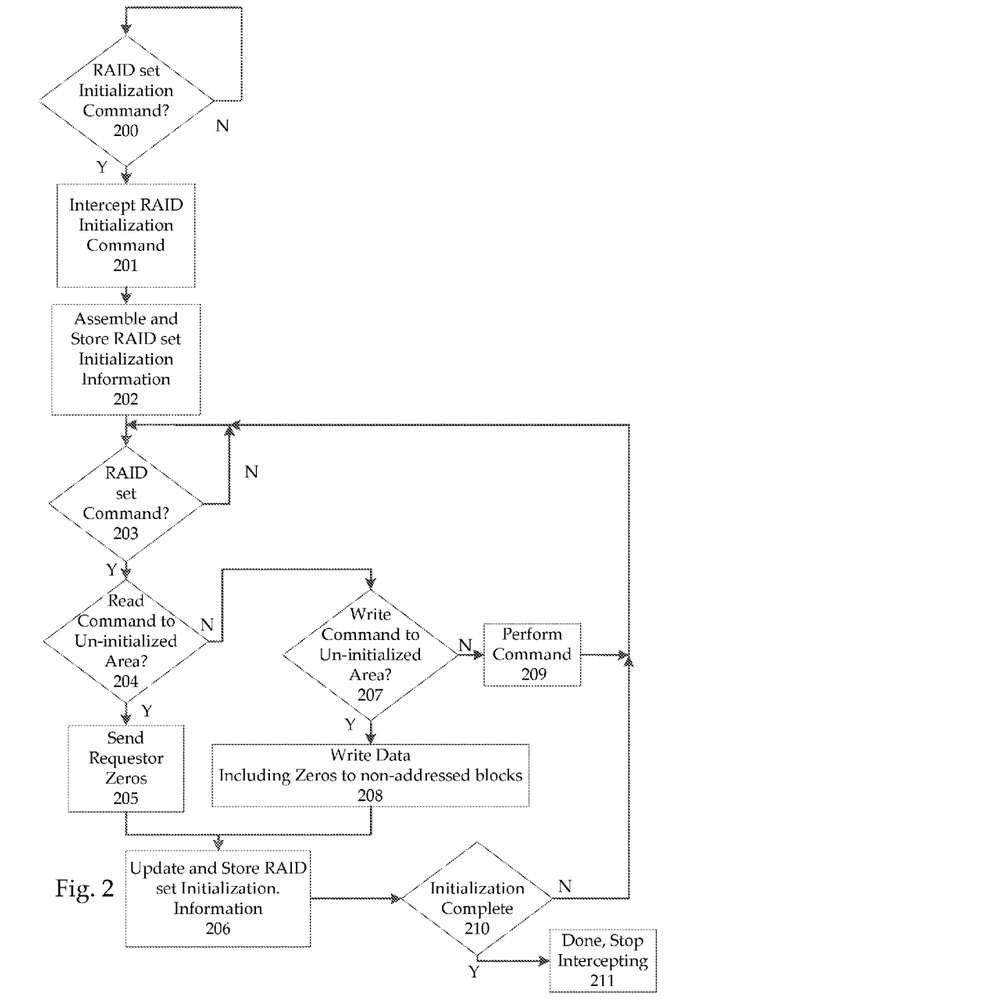
FIG. 2 is a flow chart of a method of the initialization of a RAID set.

FIG. 2 is a flow chart of a method of the initialization of a RAID set. A driver may look (i.e., snoop) for a RAID set initialization command at step 200. When the driver does not find a RAID set initialization command, the method stays in step 200. When the driver encounters a RAID set initialization command, the method proceeds to step 201 where the driver intercepts the command. Once the driver has intercepted a RAID initialization command, the driver will assemble information that describes the initialization state of the RAID set. Information describing the initialization state of the RAID set may include information identifying stripes that are currently not initialized, stripes that have already been initialized, or both. A driver or software consistent with the presently claimed invention uses this information to identify areas in a RAID set that need to be initialized. In certain instances these areas may be identified by stripe number, in other instances they may be identified by logical block (LBA) number. The method then moves to step 202, where it assembles and stores RAID set initialization information in a non-volatile memory. The RAID set initialization information may indicate that the entire RAID set is not initialized.

The driver then begins looking for (i.e., intercepting) commands directed at the RAID set at step 203. When a command for the RAID set is detected, the method moves to step 204 where the driver determines if the command is a read command addressing an uninitialized portion of the RAID set. When the command is a read command addressing an uninitialized portion of the RAID set, the driver sends zeros to the initiator of the read command 205. Program flow then moves to step 206 where the RAID set initialization information is updated and stored in the non-volatile memory.

When the command is not a read command to an uninitialized portion of the RAID set, the driver evaluates if the command is a write command to an uninitialized area of the RAID set at step 207. When the command is a write command to an uninitialized portion of the RAID set, data corresponding to the write command is written to the RAID set at step 208. Sometimes, a write to a RAID set is not a write to an entire stripe. In these instances, the driver may also write zeros to any portions of the stripe not addressed by the write command. At step 208 data associated with the write command is written to data blocks addressed by the write command, and zeros are written to data blocks in the stripe not addressed by the write command. Thus, an entire stripe may be initialized when the write command writes to a portion of an uninitialized stripe. Program flow then updates and stores the RAID set initialization information 206 in the non-volatile memory.

After the RAID set initialization information is updated and stored at step 206, the driver checks to see if the RAID set initialization process is complete 210. If initialization is complete at step 210, the method ends at step 211. Typically at step 211, the driver or software will stop intercepting commands addressing the RAID set. When the RAID set is not completely initialized, program flow moves from step 210 to step 203 where the driver snoops for more RAID set commands.

When a command directed at the RAID set is not a read command to uninitialized portions of the RAID set, program flow moves from step 204 to step 207. When the command is not a write command to uninitialized areas of the RAID set, program flow moves from step 207 to step 209. Step 209 is where any command that is not related to an uninitialized area of the RAID set is performed. Commands performed at step 209 may be commands relating to initialized areas of the RAID set, or other types of commands that may be sent the RAID set. The driver performing the RAID set initialization may pass commands performed at step 209 through to another software module without change.

FIG. 2 does not show background writes of zeros to un-initialized stripes of the RAID set. Various embodiments of the invention performing these background writes of zeros will also update and store RAID set initialization information in the non-volatile memory. The updating of RAID set initialization information in the non-volatile memory will typically be performed after a background write of zeros is performed, or after an initiator writes to an un-initialized portion of the RAID set. The description of FIG. 2, above, is exemplary, it is not intended to limit the invention. While the use of a driver is described above, the steps of FIG. 2 may be performed using one or more other software programs.

In general, methods consistent with the apparent immediate initialization of the RAID set incrementally initialize the RAID set using background writes of zeros, and by initializing previously uninitialized portions of the RAID set when write commands to the RAID set are intercepted. As the incremental initialization of the RAID set proceeds, the driver or software maintains a record of what stripes or logical blocks are not initialized. Typically this record will be maintained in a data structure stored in a non-volatile memory. The data structure of this record includes, yet is not limited to a B-Tree, an array, or a linked list. When the data structure used to store this record has a tree structure, information created to describe the initialization state of the RAID set may be stored in a base node of the tree. Furthermore, subsequent updates to this information may be stored in one or more child nodes of the tree.

In other implementations of the invention, the driver or software may maintain a record of what stripes or logical blocks are initialized, instead of those that are not initialized. Since, the driver or software will typically be aware of the total number of stripes or logical blocks that are contained in the RAID set, the driver or software operating on a processor can determine which stripes or logical blocks are not initialized when it has a record of the logical blocks that are initialized. Similarly, the driver or software can determine which stripes or logical blocks are initialized when the driver or software has a record of the logical blocks that are not initialized, when the driver or software is aware of the total number of stripes or logical blocks that are contained within the RAID set.

Figure 3:
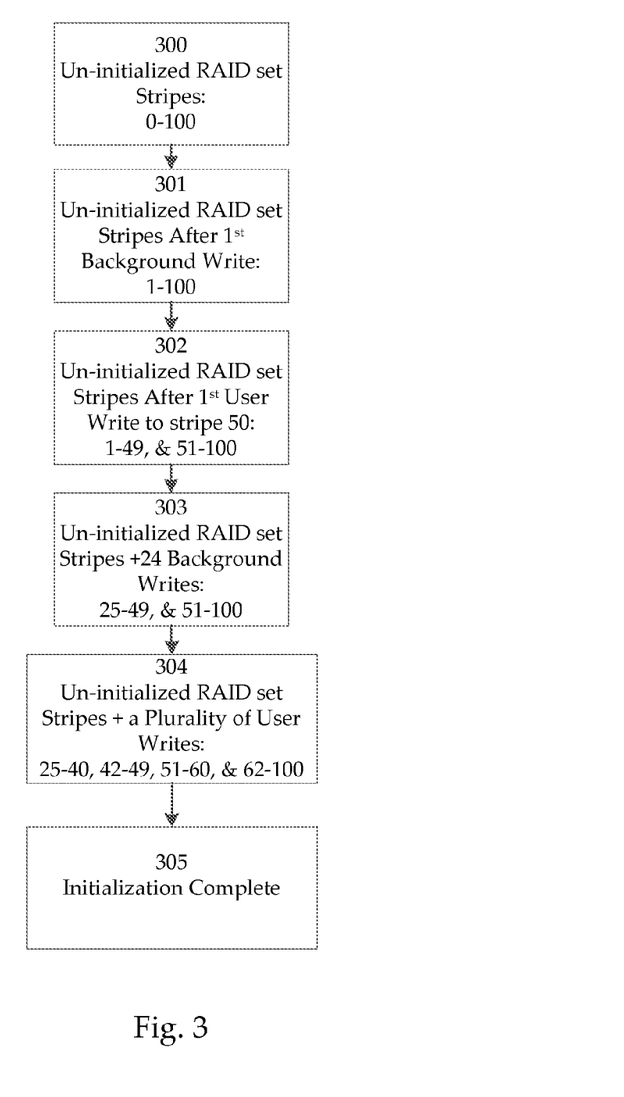
FIG. 3 is a flow chart of a method of the initialization of the RAID set as the initialization occurs incrementally over time.

Over time, uninitialized portions of the RAID stripe are initialized using processes consistent with those reviewed above. Throughout this process, information describing the initialization of the RAID set will be updated in the non-volatile memory either incrementally or periodically as the RAID set initialization proceeds. FIG. 3 is a flow chart of a method of the initialization of the RAID set as the initialization occurs incrementally over time. In the example shown in FIG. 3, step 300, the uninitialized RAID set initially includes stripes 0-100. After a first background write, stripes 1-100 are uninitialized at step 301. After a first user write to RAID stripe 50, RAID stripes 1-49, & 51-100 remain uninitialized at step 302. Next, after an additional 24 background writes, the uninitialized stripes include stripes 25-49, & 51-100. As a plurality of additional user writes occurs at step 304, stripes 25-40, 42-49, 51-60, and 62-100 are uninitialized. When all uninitialized areas of the RAID set have been initialized, the initialization is complete 305. When all stripes or logical blocks of the RAID set have been written, the driver may stop intercepting commands to the RAID set.

Information that describes the initialization state of the RAID set may be stored in different types of memory and memory locations. For example, information may be stored in the uninitialized stripes of the RAID set, in a dedicated location within a data storage device, in a memory within a RAID box, in a data storage device that is external to the RAID set, or combination thereof. Types of non-volatile memory where the information that describes the initialization state of the RAID set may be stored include, yet are not limited to: a disk drive, a flash drive, flash memory, phase change memory, resistive memory (RERAM), ferroelectric memory (FERAM), battery backed up dynamic random access memory, or racetrack memory. Data storage devices in the RAID set itself may also consist of different types of memory that include, yet are not limited to: disk drives, flash drives, flash memory, phase change memory, resistive memory (RERAM), ferroelectric memory (FERAM), battery backed up dynamic random access memory, or racetrack memory.

When the information describing the initialization state of the RAID set is stored in a RAID stripe, the driver may be required to change where the information is stored. For example, when this information is stored in stripe 100, and stripe 100 is written to by a user, the driver will move the information to another stripe. In such an embodiment, the driver will typically track the stripe number where the information is stored. The driver may also maintain a pointer to that stripe in a small piece of non-volatile memory. When a write to the last remaining stripe is intercepted, the driver may assign the last remaining stripe the last remaining stripe number, and then write data to the stripe.

In certain instances, the driver may not allow a user level application program to use all stripes that the RAID set contains. For example, the RAID set may allow a user to access stripes 0-99, and use stripe 100 for storing the information. In some of these instances, the present system may change the mapping of the stripes of the RAID set. When changing the mapping, the driver could map stripes 1-100 as user stripes 0-99 and use the original stripe 0 to store the information.

The information describing the initialization state of the RAID set may be stored in a reserved area of a data storage device. In these embodiments the driver (or other software) may artificially change the maximum logical block of a data storage device in the RAID set. The driver may also reserve logical blocks above the artificial maximum logical block for storing the initialization information.

Today, disk drives and FLASH drives can be programmed to report a maximum logical block number that is below the real maximum logical block in the drive. Logical blocks on these drives can be accessed by software that is aware that the data storage devices capacity was truncated. In certain embodiments of the invention the reserved area of the data storage device is accessed using special commands. Most user level programs will not be aware that a drives capacity has been truncated. Typically, such programs would not be able to access the logical blocks in the reserved area because they would not be aware that the reserved area exists. Truncating the capacity of a disk drive in this way is commonly referred to as de-stroking the drive.

An example of special commands used to truncate the capacity of a data storage device include the Read Native Max Capacity and the Set Max Address commands from the data storage advanced technology attachment (ATA) specification. First the total native capacity of a disk drive is determined using the Read Native Max Capacity command. Then the capacity of the drive may be artificially set to a capacity less than the total capacity of the drive by sending the drive a Set Max Address command with a maximum LBA number. The ATA Set Max Address command causes the drive to enter the maximum LBA number provided with the command into a table inside of the drive. The drive will now service commands addressing LBA0 through the maximum LBA number provided with the command. At this time, conventional commands attempting to access an LBA beyond this artificial maximum LBA will cause drive to respond with an error message. LBAs located above this artificial maximum LBA may be accessed by sending the drive another Set Max Address command with a maximum LBA corresponding to the Native Max Capacity of the drive. During the time when the maximum capacity of the drive is equal to the native capacity of the drive, the driver or software will typically intercept and stall commands addressing the RAID set. After the driver or software accesses LBAs above the artificial maximum LBA, the driver or software once again can truncate the capacity of the drive using the Set Max Address command. In this manner, a driver or software consistent with embodiments of the invention may access information located above the artificial maximum LBA when other programs or initiators cannot. The example above is for exemplary purposes, it is not intended to limit the scope of the invention described herein.

In certain instances, a first data storage device selected by the operator to be included in a RAID set may already store data that the operator wishes to save in a RAID configuration. In these embodiments the data contained in the first data storage device will have to be converted from a non-RAID configuration to a RAID configuration. When converting to a RAID 1 level, the data conversion process will include copying data from the first data storage device to a second data storage device. When converting to a RAID level that uses striping, the conversion process will include a series of other background tasks.

When the conversion process includes copying the data stored on the data storage device to another data storage device any write commands targeting the RAID set will be written to the first data storage device and to a second data storage device. Any read commands sent to the RAID set will be read from the first data storage device. At this time the logical blocks read from the first data storage device may be written to the second data storage device. As data is written to the second data storage device, the drive will store RAID set initialization information to the non-volatile memory. Depending on the particular implementation, the RAID set initialization information may include information identifying the data areas or logical blocks that are different from, or identical to data areas or logical blocks on the first data storage device.

Figure 4A:
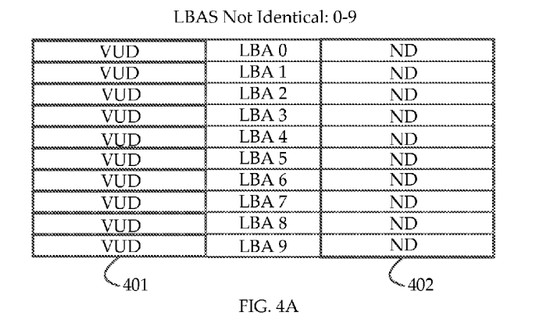
FIG. 4A illustrates two data storage devices in an uninitialized RAID 1 level.

FIG. 4A shows two data storage devices in an un-initialized RAID 1 level (copy). Here, the two data storage devices 401 & 402 are in an un-initialized RAID 1 level (copy) configuration. Each of these data storage devices (401 & 402) include logical blocks 0-9, where each logical block has a logical block address 0-9 (LBA 0-9). All of the LBAs (0-9) in data storage device 401 in FIG. 4A contain valid uninitialized data VUD stored in a non-RAID configuration. Since LBAs 0-9 on data storage device 402 in FIG. 4A do not contain valid data (initialized or uninitialized), they are depicted as containing no data ND.

When, an operator initiates the conversion of data storage device 401 to a RAID 1 level (copy), data is copied from data storage device 401 to data storage device 402 using background tasks. Before any background initialization tasks are performed, all of the LBAS on these drives are uninitialized to the RAID 1 level, thus LBAS 0-9 are not identical on the two data storage devices 401 & 402.

Figure 4B:
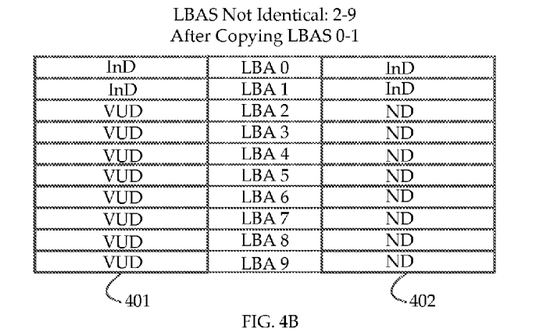
FIG. 4B illustrates the two data storage devices shown in FIG. 4A, with data copied from the first data storage device to the second data storage device.

Copying data from one data storage device to another comprises reading one or more LBAs on a first data storage device 401, and writing that data to a second data storage device 402. As mentioned above, the process of copying (reading then writing) may be performed in a background task, or may be performed when a read command to the RAID set is received. FIG. 4B shows the same two data storage devices shown in FIG. 4A, with data copied from the first data storage device to the second data storage device. Here, LBAS 0-1 have been copied from data storage device 401 to data storage device 402. In FIG. 4B data stored in LBA 0 of data storage device 401 is identical to data stored in LBA 0 of data storage device 402, and data stored in LBA 1 of data storage device 401 is identical to data stored in LBA 1 of data storage device 402. FIG. 4B depicts LBAS 0-1 data storage device 401 and data storage device 402 containing initialized data InD. These LBAs have been initialized to RAID 1 level. At this time, LBAs 2-9 on data storage device 401 contain valid uninitialized data VUD, and LBAS 2-9 on data storage device 402 contain no data ND.

Figure 4C:
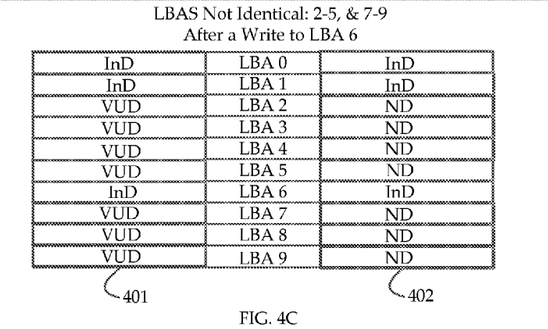
FIG. 4C illustrates the two data storage devices shown in FIG. 4B after a write command has been received to an LBA.

FIG. 4C shows two data storage devices shown in FIG. 4B after a write command has been received to an LBA. In this instance, LBA 6 is written to both data storage devices 401 & 402. In this figure, LBAS 2-5, & 7-9 contain valid uninitialized data VUD on data storage device 401, and LBAS 2-5, & 7-9 on data storage device 402 contain no data ND; LBAS 2-5, & 7-9, therefore do not contain initialized data. FIG. 4C also depicts, LBAs 0-1 & 6 in both data storage devices 401 & 402, containing initialized data InD.

The process for converting, data from the first drive to a RAID configuration using stripes includes a series of different steps. In these embodiments, background tasks include reading data on the first data storage device, and writing that data in a series of stripes to the drives in the RAID set. When a write occurs to an uninitialized portion of the RAID set, the driver will intercept the write command and write stripes of data to the RAID set. When such a write command does not include a complete stripe, additional data will be read from the first drive, and that data will be written to the plurality of data storage devices in the RAID set in complete stripes. At some point, when all data from the first drive has been moved to stripes in the RAID set, the RAID set may still contain un-initialized areas. Any un-initialized areas of the RAID set may be initialized using the read and write processes reviewed above, including processes like those reviewed in FIG. 2. In this embodiment, however, read requests targeting data residing in uninitialized areas on the first data storage device, will be read from the first data storage device. After servicing the read command, the data read from the first data storage device may then be written to the RAID set in complete stripes.

Figure 5A:
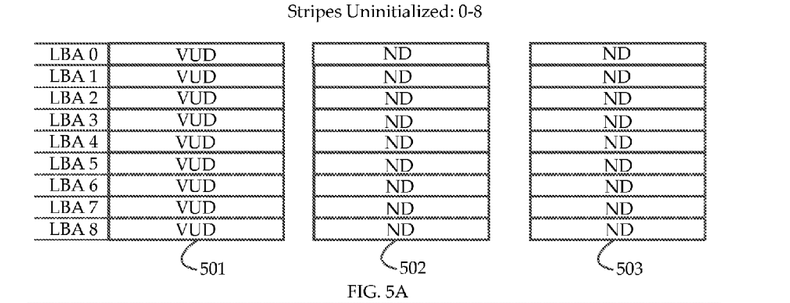
FIG. 5A illustrates a first data storage device containing valid uninitialized data and two other data storage devices that do not contain valid data.

FIG. 5A depicts a first data storage device containing valid uninitialized data and two other data storage devices that do not contain valid data. Here, the first data storage device 501 contains valid uninitialized data VUD in LBAS 0-8 (these LBAS contain valid data in an uninitialized RAID state). FIG. 5A also includes two other data storage devices 502 & 503. LBAS in data storage device 502 & 503 do not contain valid data (initialized or uninitialized); these LBAs are depicted as containing no data ND.

Figure 5B:
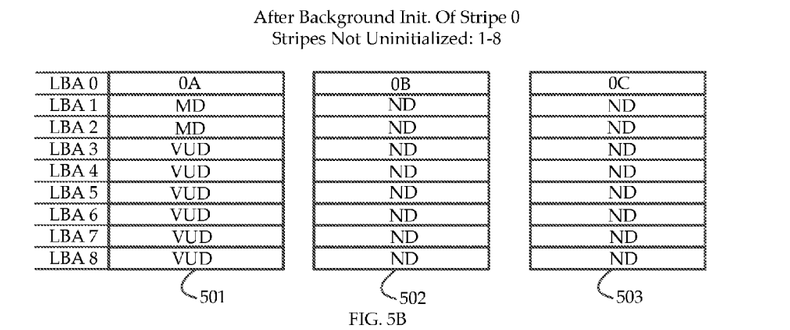
FIG. 5B illustrates a RAID stripe written in stripes to three data storage devices.

FIG. 5B depicts a RAID stripe written in stripes to three data storage devices. Here, RAID stripe 0 is written in stripes to data storage devices 501, 502, and 503. RAID stripe 0 was written after reading LBAs 0-2 on data storage device 501 in one or more background tasks. At this time, LBA 0 in data storage device 501 contains stripe 0A, LBA 0 in data storage device 502 contains stripe 0B, and LBA 0 in data storage device 503 contains stripe 0C. Furthermore, LBAS 3-8 in data storage device 501 contain valid uninitialized data VUD. LBAS 1-8 on data storage devices 502 and 503, in the figure, contain no data ND (these LBAS do not contain data belonging to the RAID set). LBAS 1-2 on data storage device 501 are depicted as containing moved data MD. Data from these LBAS has already been moved (i.e., migrated) to RAID stripe 0.

Figure 5C:
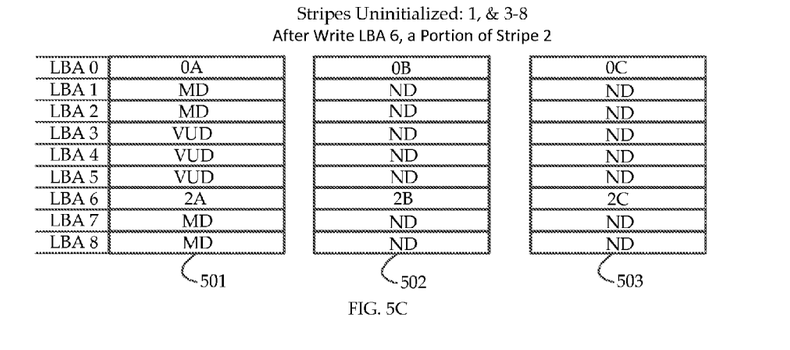
FIG. 5C illustrates a second RAID stripe written in stripes to the same data storage devices shown in FIG. 5B after a write to a portion of a stripe in the RAID set.

Since write commands are serviced while converting to an initialized RAID state, some implementations of the process may also include read modify writes. FIG. 5C shows a second RAID stripe written in stripes to the same data storage devices shown in FIG. 5B after a write to a portion of a stripe in the RAID set. In the figure, RAID stripe 2 is written to LBA 6 on data storage devices 501, 502, & 503. Here data storage device 501 contains stripe 2A, data storage device 502 contains stripe 2B, and data storage device 503 contains stripe 2C. In this instance, data stripe 2 was created after receiving a write to LBA 6, a portion of data stripe 2. Since a mapping of LBAs on data storage device 501 map to data stripe 2, data stripe 2 should include data stored corresponding to uninitialized LBAs 6-8 on data storage device 501. The steps performed when creating RAID stripe 2 are essentially a read modify write. In this instance, these steps include: receiving a write command targeting LBA 6, reading LBAs 7-8 on data storage data storage device 501, combining data from the write command to LBA 6 with data read from LBAs 7-8, and then writing stripe 2 to LBA 6 on each of the data storage devices 501, 502, & 503.

LBAs in FIG. 5C that do not contain valid uninitialized data or initialized data, are depicted as containing no data ND. Here, LBAs 1-2 & 7-8 on data storage device 501 are depicted as containing moved data MD. This data has already been moved (i.e., migrated) to RAID stripes 0 or 2. At this time, LBAs 1-5 & 7-8 on data storage devices 502 & 503 are depicted as containing no data ND.

The process of mapping LBAs, on a data storage device that contains valid initialized data may include sequentially associating LBA number to stripe number. An example of a simple sequential mapping of LBA to stripe number is where the LBA number corresponds to stripe number. When there are three data storage devices in a RAID set, such a mapping could map LBA 0 on each of the three data storage devices to stripe 0, map LBA 1 on each of the three data storage devices to stripe 1, and map each subsequent LBA number on the data storage devices to subsequent stripes.

In contrast, the mapping of LBAs to stripes in FIG. 5C is not sequential. Here, stripe 0 is mapped to LBA 0 on each of the three data storage devices, yet stripe 2 is mapped to LBA 6 on each of the three data storage devices. In such an instance, translation information could be maintained or referenced by the driver (or other software) as the RAID set is initialized. This translation information, in some instances may be stored in a translation table.

Yet other implementations may include a first data storage device containing valid uninitialized data that needs to be migrated to a RAID set that does not contain the first data storage device. Here again, background tasks may include reading data on the first data storage and writing that data in complete stripes to the RAID set. When a write command targeting data on the first data storage device is received, that data will be written to the RAID set. Furthermore, additional data may be read from the first drive such that complete stripes can be written to the RAID set. Any uninitialized areas of the RAID set may also be initialized using the read and write processes reviewed above, including processes like those reviewed in FIG. 2.

The above description is illustrative and not restrictive. Many variations of the invention will become apparent to those of average skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A method for initializing a redundant array of inexpensive disks (RAID) set, the method comprising:
   creating information by a processor executing instructions according to a driver software module, the information describing an initialization state of the RAID set corresponding to an intercepted RAID set initialization command, wherein the driver software module is located below a RAID set configuration application program associated with an application layer in a layered software stack, and the driver software module allocates an initial stripe of the RAID set for storing the information describing the initialization state of the RAID set;
   performing by the driver software module:
      intercepting a data transfer command associated with the RAID set, wherein the data transfer command is from an initiator; and
      when the intercepted data transfer command is a read command addressing an uninitialized portion of the RAID set, transmitting data to the initiator of the data transfer command; and
      when the transfer command is a write command to the initial stripe of the RAID set, performing:
         reallocating the information describing the initialization state of the RAID set to a second stripe of the RAID set; and
         writing data associated with the write command to the initial stripe of the RAID set; and
         further updating the information describing the initialization state of the RAID set in the second stripe of the RAID set when required.

2. The method of claim 1, further comprising:
   writing zeros to selected uninitialized portions of the RAID set, when desired; and
   updating the information describing the initialization state of the RAID set at its currently stored location in the RAID set, after writing the zeros to the selected uninitialized portions of the RAID set.

3. The method of claim 1, wherein:
   the data transmitted consists of zeros, and
   the zeros transmitted are not read from a data storage device in the RAID set.

4. The method of claim 1, wherein the data transmitted includes valid uninitialized data from a data storage device, the method further comprising:
   writing the valid uninitialized data to another data storage device;
   or writing the valid uninitialized data to one or more other stripes associated with a plurality of data storage devices, wherein the information describing the initialization state of the RAID set is updated at its currently stored location in the RAID set, after the valid uninitialized data is written to the another data storage device or is written to the one or more other stripes associated with the plurality of other data storage devices.

5. The method of claim 1, further comprising:
   writing data from the data transfer command to the RAID set when the data transfer command is a write command to the RAID set;
   updating the information describing the initialization state of the RAID set at its currently stored location in the RAID set after writing the data from the write command.

6. The method of claim 5, wherein the data written includes:
   data from the write command, and
   zeros added to the data from the write command when the write command does not span a complete stripe.

7. The method of claim 5, wherein the data written is identical data written to at least two data storage devices.

8. The method of claim 5, further comprising:
   reading data from one or more data storage devices when the write command does not span a complete stripe, wherein the data read includes data from data areas not addressed by the write command;
   forming a complete stripe by combining the data read with the write data from the write command; and
   writing the complete stripe to the RAID set.

9. The method of claim 1 wherein the information describing the initialization state of the RAID set is not accessible to a user application program and is accessible to the processor according to the driver software module.

10. A non-transitory computer readable storage medium having embodied thereon a program executable by a processor to perform a method comprising:
   create information describing the initialization state of the RAID set according to a driver software module, wherein the information corresponds to an intercepted RAID set initialization command, and the driver software module is located below a RAID set configuration application program associated with an application layer in a layered software stack;
   allocate by the processor an initial stripe of the RAID set for storing the information describing the initialization state of the RAID set according to the driver software module;
   intercept a data transfer command associated with the RAID set, wherein the data transfer command is from an initiator; and
   when the intercepted data transfer command is a read command addressing an uninitialized portion of the RAID set, transmit data to the initiator of the data transfer command; and
   when the transfer command is a write command to the initial stripe of the RAID set, the program further executable to:
      reallocate the information describing the initialization state of the RAID set to a second stripe of the RAID set; and
      write data associated with the write command to the initial stripe of the RAID set; and
      further update the information describing the initialization sate of the RAID set in the second stripe of the RAID when required.

11. The non-transitory computer readable storage medium method of claim 10, the program further executable to:

write zeros to selected uninitialized portions of the RAID set, when desired; and update the information describing the initialization state of the RAID set at its currently stored location in the RAID set, after writing the zeros to the selected uninitialized portions of the RAID set.

12. The non-transitory computer readable storage medium method of claim 10, wherein:

the data transmitted includes zeros, and the zeros transmitted are not read from a data storage device in the RAID set.

13. The non-transitory computer readable storage medium method of claim 10, wherein the data transmitted includes valid uninitialized data from a data storage device, and the program is further executable to:

write the valid uninitialized data to another data storage device; or write the valid uninitialized data to one or more other stripes associated with a plurality of data storage devices, wherein the information describing the initialization state of the RAID set is updated at its currently stored location in the RAID set, after the valid uninitialized data is written to the another data storage device or is written to the one or more other stripes associated with the plurality of other data storage devices.

14. The non-transitory computer readable storage medium method of claim 10, the program further executable to:

write data from the data transfer command to the RAID set when the data transfer command is a write command to the RAID set; and update the information describing the initialization state of the RAID set at its currently stored location in the RAID set after writing the data from the write command.

15. The non-transitory computer readable storage medium method of claim 14, wherein the data written includes:

data from the write command, and zeros added to the data from the write command when the write command does not span a complete stripe.

16. The non-transitory computer readable storage medium method of claim 14, wherein the data written is identical data written to at least two data storage devices.

17. The non-transitory computer readable storage medium method of claim 14, the program further executable to:

read data from one or more data storage devices when the write command does not span a complete stripe, wherein the data read includes data from data areas not addressed by the write command; and form a complete stripe by combining the data read with the write data from the write command; and write the complete stripe to the RAID set.

18. The non-transitory computer readable storage medium method of claim 10, wherein the information describing the initialization state of the RAID set is not accessible to a user application program and is accessible to the processor according to the driver software module.

* * * * *